United States Patent [19]
Pillar et al.

[11] Patent Number: 5,417,299
[45] Date of Patent: May 23, 1995

[54] ALL-WHEEL STEERING SYSTEMS

[75] Inventors: Duane R. Pillar; Michael C. Wrege, both of Oshkosh, Wis.; Calvin J. Kraning, Valley City, N. Dak.

[73] Assignee: Oshkosh Truck Corporation, Oshkosh, Wis.

[21] Appl. No.: 159,025

[22] Filed: Nov. 29, 1993

[51] Int. Cl.⁶ .............................................. B62D 5/06
[52] U.S. Cl. .................... 180/140; 180/24.01; 280/426; 280/443
[58] Field of Search .............. 180/140, 79.1, 24.01; 280/91, 419, 426, 442, 443; 364/424.01, 424.05

[56] References Cited

U.S. PATENT DOCUMENTS

| | | | |
|---|---|---|---|
| 2,512,979 | 6/1950 | Strother | 180/140 |
| 2,526,282 | 10/1950 | Sanmori | 180/140 |
| 3,185,245 | 5/1965 | Hoyt | 180/140 |
| 3,724,585 | 4/1973 | Conrad | 180/140 |
| 4,161,329 | 7/1979 | Pilz et al. | 180/140 |
| 4,175,638 | 11/1979 | Christensen | 180/140 |
| 4,186,814 | 2/1980 | Hart | 180/24.01 X |
| 4,263,979 | 4/1981 | Sturgill | 180/79.1 |
| 4,295,657 | 10/1981 | Sano et al. | 280/91 |
| 4,335,800 | 6/1982 | Arato | 180/140 X |
| 4,373,603 | 2/1983 | Nelson | 180/236 |
| 4,446,941 | 5/1984 | Laurich-Trost | 180/236 |
| 4,483,547 | 11/1984 | Furukawa et al. | 280/91 |
| 4,621,702 | 11/1986 | Kanazawa et al. | 180/140 |
| 4,657,102 | 4/1987 | Kanazawa et al. | 180/140 |
| 4,669,744 | 6/1987 | Sano et al. | 280/91 |
| 4,679,809 | 7/1987 | Ito et al. | 280/91 |
| 4,695,068 | 9/1987 | Kawamoto et al. | 280/91 |
| 4,705,135 | 11/1987 | Kawamoto et al. | 180/236 |
| 4,706,978 | 11/1987 | Ito | 280/91 |
| 4,750,628 | 6/1988 | Laurich-Trost | 180/140 X |
| 4,880,072 | 11/1989 | Sakamoto et al. | 180/140 |
| 4,970,647 | 11/1990 | Karadsheh et al. | 364/424.05 |
| 4,971,173 | 11/1990 | Takahashi | 180/140 |
| 5,010,971 | 4/1991 | Hamada et al. | 180/140 |
| 5,076,382 | 12/1991 | Vaughn et al. | 180/140 |
| 5,111,901 | 5/1992 | Bachhuber et al. | 180/140 |
| 5,194,851 | 3/1993 | Kraning et al. | 180/140 X |
| 5,217,083 | 6/1993 | Bachhuber et al. | 180/140 |
| 5,226,499 | 7/1993 | Kanazawa et al. | 180/140 |

Primary Examiner—Mitchell J. Hill
Assistant Examiner—Kevin Hurley
Attorney, Agent, or Firm—Baker & McKenzie

[57] ABSTRACT

A full-time all wheel steering system is provided whereby the rear wheel angle is determined by the front wheel angle and a relational curve, polynomial equation or set of tabulated values. The front wheel angle is measured and the desired rear wheel angle is calculated by a programmable controller. If the desired rear wheel angle is not sufficiently close to the actual rear wheel angle, the controller means sends a signal which results in adjustment of the rear wheel angle. The desired rear wheel angle may be a function of the vehicle speed as well as the front wheel angle. Further, the operator may select from a plurality of relational curves, polynomial equations, tabulated values as well as a plurality of manually selectable modes including an independent rear wheel steering mode. The system is applicable to passenger cars, trucks and tractor-trailer rigs.

31 Claims, 10 Drawing Sheets

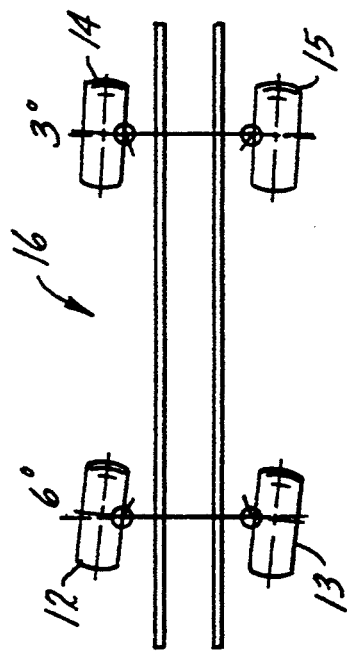
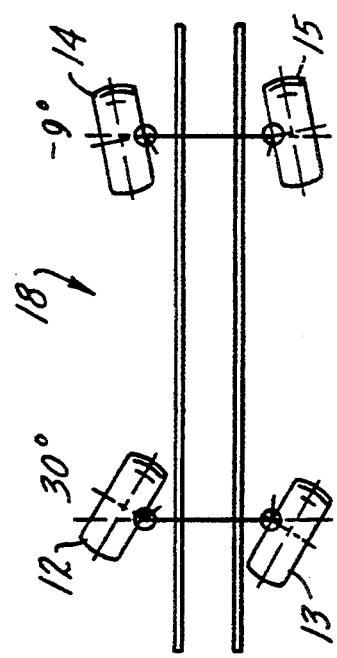
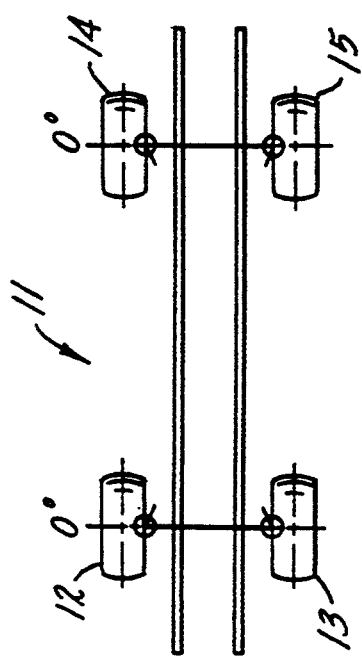
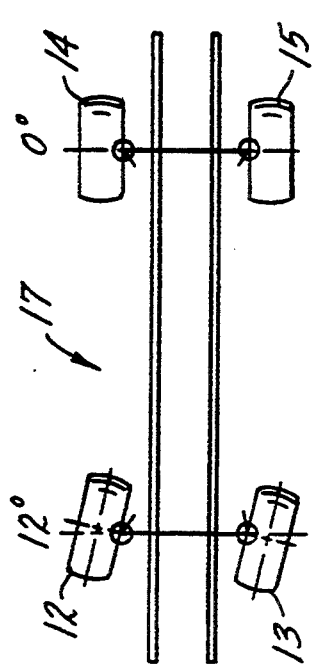
Fig. 1.

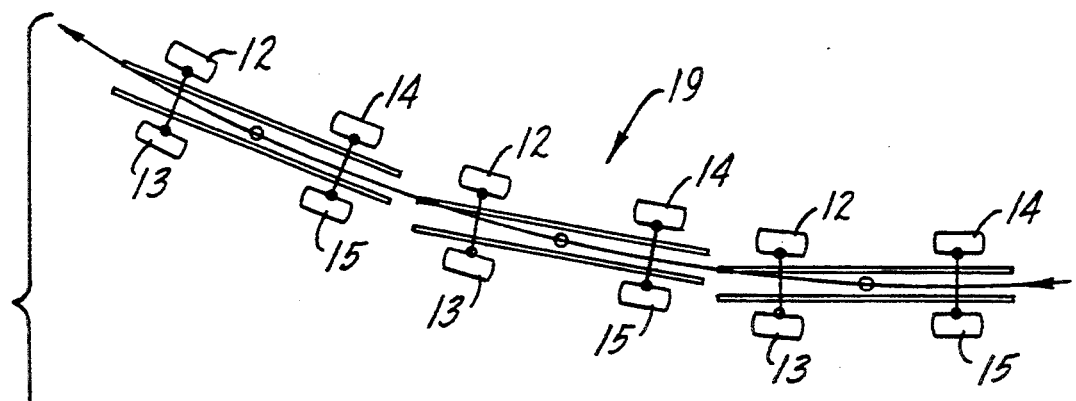
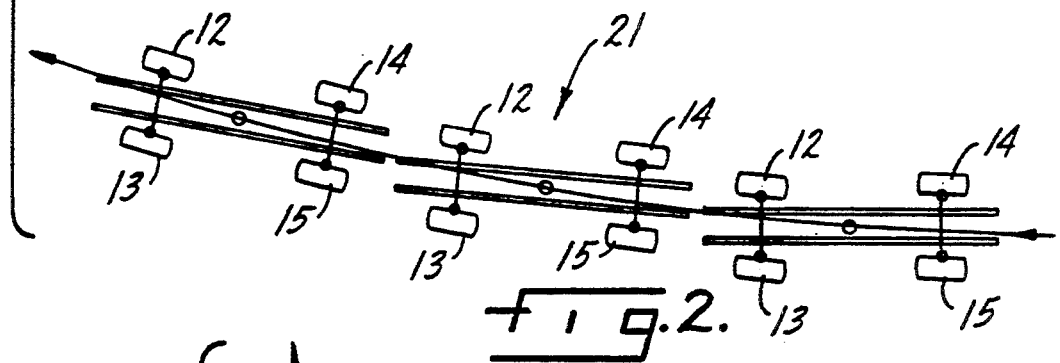
Fig. 2.
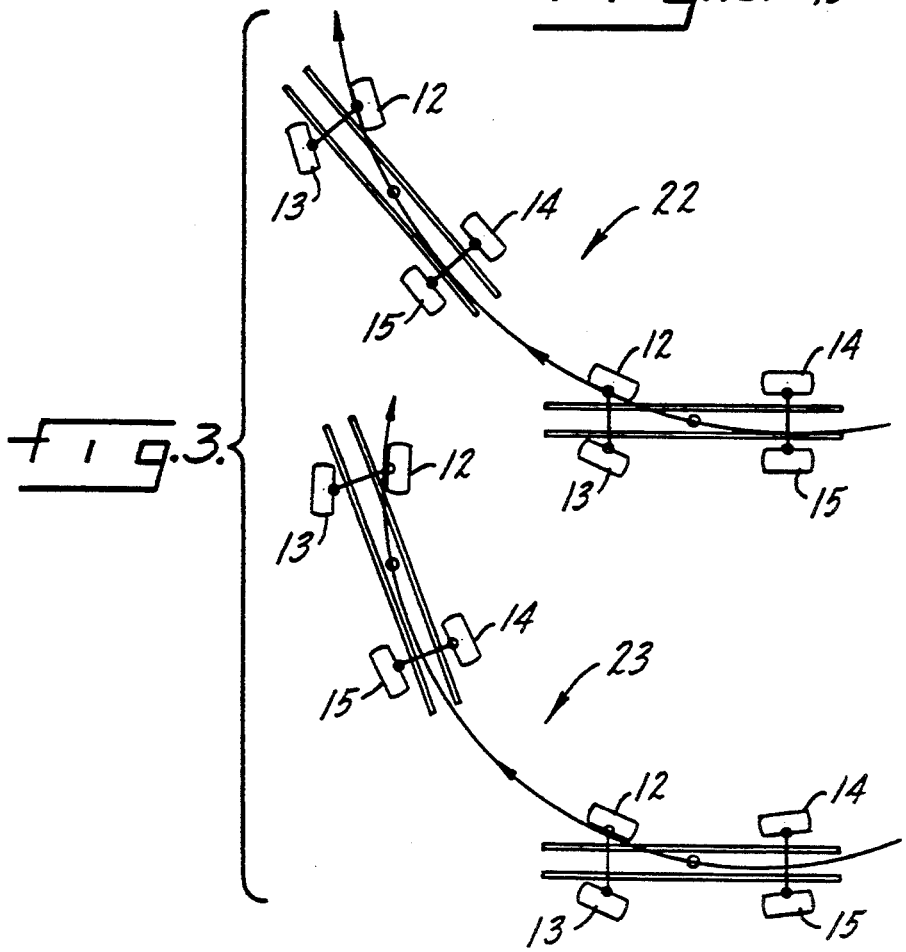
Fig. 3.

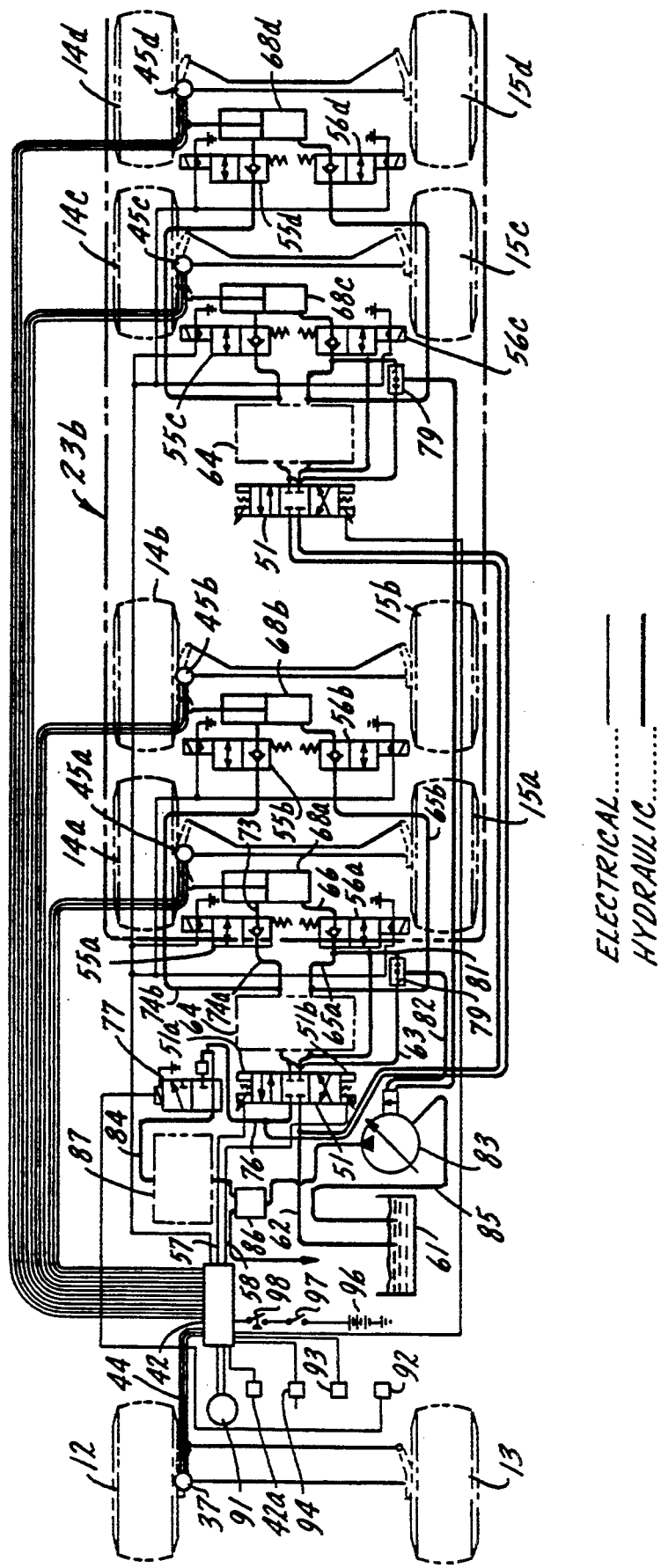

ALL-WHEEL STEERING SYSTEMS

FIELD OF THE INVENTION

This invention relates generally to all-wheel steering systems for vehicles and trailers and specifically to all-wheel steering systems controlled by a microcomputer or a programmable controller. The invention relates to vehicles with one or more rear axles and to vehicles equipped with trailers having one or more axles. The invention also includes a plurality of operator selectable steering modes as well as a plurality of automatic full-time all-wheel steering modes. The desired rear wheel angle is a function of the front wheel angle and is retrieved from the memory of the programmable controller.

BACKGROUND OF THE INVENTION

The concept of all-wheel steering is well known. Dozens of all-wheel steering systems are disclosed in U.S. and foreign patents. Some known all-wheel steering systems are purely mechanical, meaning that the rear wheel angle is determined by gears and gear ratios manually selected by the vehicle operator with the shift of a lever. Other all-wheel steering systems provide rear wheel steering independent of the front wheel angle where the operator steers the rear wheels independently of the front wheels, the rear wheels being steered with a separate steering wheel, joy stick or potentiometer.

Automatic methods of all-wheel steering are also known. In these systems, a microcomputer will control the rear wheel angle in accordance with various physical relationships that are functions of various parameters. For example, it is known to control the rear wheel angle in accordance with the front wheel-to-rear wheel steering angle ratio. It is also known to control the rear wheel angle indirectly by controlling the rear wheel speed so that the desired rear wheel speed is nearly equal to the actual front wheel speed. Other systems control the rear wheel angle after solving a series of complex equations that are functions of the steering angle, vehicle speed and other parameters. Finally, in some all-wheel steering systems, the rear wheel angle is a function of the speed of rotation of the steering wheel.

Our concept of all-wheel steering has been applied to larger vehicles such as trucks and aircraft rescue and fire fighting equipment (ARFF). Larger vehicles generally have high centers of gravity which makes them prone to roll-overs if large lateral g-forces are experienced. All-wheel steering allows larger vehicles to maneuver safely at high speeds because all-wheel steering systems can reduce the lateral g-forces imposed on the vehicle during sharp turns and lane changes at high speeds. Further, many trucks, including fire fighting trucks, must be able to maneuver into small spaces in short periods of time. All-wheel steering provides great benefits in this regard because it provides a smaller minimum turning radius.

The prior art teaches all-wheel steering systems with four principal steering modes: front wheel only, crab, coordinated and independent rear wheel. In front wheel only steering, the steering of the vehicle is dependent upon the front wheel position only and the rear wheels maintain a straight-ahead position, or 0° steering angle. Front wheel only steering is appropriate at both low and high speeds.

In crab steering, the front wheels and rear wheels are steered in the same direction. Crab steering improves the vehicle's stability at high speeds allowing the vehicle to change lanes and avoid obstacles with less vehicle yaw and improved traction. Crab steering lowers the lateral g-forces by increasing the turning radius for a given front wheel angle thereby lowering the chances of roll-overs for vehicles with relatively high centers of gravity, such as aircraft, rescue and fire fighting vehicles (ARFF). Because the rear of the vehicle is also steered to the side by the rear wheels, the increased turning radius is not detrimental to obstacle avoidance. Crab steering is also beneficial to passenger cars because it allows the driver to change lanes or avoid obstacles quickly and safely. Crab steering is effective at moderate to high speeds.

In coordinated steering, the front wheels and rear wheels are turned in generally opposite directions. Coordinated steering is safely employed for low speed maneuvers only. Coordinated steering improves the vehicle's maneuverability by reducing the minimum turning radius. This increased maneuverability is especially beneficial to vehicles with long wheel bases such as heavy duty trucks and ARFF equipment, but is also greatly appreciated by the drivers of passenger cars. The reduced minimum turning radius makes it easier for the drivers of passenger cars as well as trucks to maneuver and park in congested city traffic.

Further, in independent rear wheel steering, the rear wheels are controlled independently of the front wheels. Rear wheel steering requires an additional and separate steering mechanism for the rear wheels which is separate and apart from the conventional steering wheel used to control the front wheels.

The present invention makes several contributions to the art of all-wheel steering. First, the present invention provides two improved means for calculating or selecting the desired rear wheel angle based upon the front wheel angle. A first means of calculating the desired rear wheel angle employs a relational curve to be used at moderate to high speeds and features a programmable "dead band" that allows a certain amount of front wheel movement during which the rear wheels will remain in the straight-ahead or 0° position. A second improved means for calculating the desired rear wheel angle employs a relational curve that may be used for straight-ahead, coordinated and crab modes of steering. The operator or programmer may select from a variety of relational curves or polynomial equations in order to tailor the front to rear relational curves to the vehicle. Further, the driver may select from a variety of relational curves so that different relational curves may be provided for different driving conditions.

Further, the present invention alleviates the steering problem known as off-tracking that is most commonly associated with trucks and trailers or tractor-trailer rigs. Off-tracking occurs when the driver turns causing the side of the trailer or vehicle to move laterally in the direction of the turn. The amount of off-tracking is proportional to the turn and off-tracking occurs to a certain extent for all turns greater than 0°. If the driver doesn't take the turn at an angle that is wide enough, the trailer or vehicle can engage the curb or an object located on a street corner, such as a signal light. All wheel steering can be used with trailers to allow tractor-trailer rigs to make sharp turns in the coordinated mode. In the coordinated mode, the trailer wheels and particularly the rear wheels of the trailer will steer in a direction opposite of the turning direction or the direction of the front wheels of the tractor thereby steering the trailer around obstacles located on a street corner. In effect, the trailer more accurately tracks the path of the tractor thereby alleviating the off-tracking problem.

In one preferred embodiment, a delay in turning the rear wheels of the trailer enhances the tracking of the rig through a turn because the delay enables the trailer to more accurately follow the path of the tractor without the tractor travelling outside of the truck's path at the start of the turn. Crab steering enhances the obstacle avoidance and lane-changing ability of tractor-trailer rigs and is useful when backing up tractor-trailer rigs because it makes them behave like straight trucks.

Finally, the present invention allows the driver to manually select from front wheel only, crab, coordinated and independent rear wheel steering modes as well as a variety of all-wheel steering modes.

BRIEF DESCRIPTION OF THE INVENTION

The present invention provides an improved and simplified way to control the rear wheel angle in all-wheel steering systems. The all-wheel steering system of the present invention is equally applicable to both cars and trucks with two or more axles as well as tractor-trailer rigs. Vehicles with more than one rear axle may be equipped to control each pair of rear wheels independently or all rear wheels may be controlled in tandem. Multiple rear axles can be steered by either electronically steering one wheel end on one axle and mechanically linking the other wheel ends to the wheel end or by electronically steering multiple wheel ends at predetermined rates to effectively create electronic tie rods.

The all-wheel steering system of the present invention works first by sensing or measuring the front wheel angle of at least one front wheel. The front wheel angle is then communicated to a controller or controller means which is preferably in the form of a microcomputer. The controller means includes memory capacity. The controller means calculates a desired rear wheel angle based upon the just-measured front wheel angle and a relational curve, a set of tabulated values, or a polynomial relationship that is dependent upon the steering mode which has been selected by the operator. In one preferred embodiment, a front to rear relational curve is chosen for moderate to high speeds that includes a dead band, which is chosen value, such as 5°, whereby the rear wheels remain in a straight-ahead position when the front wheels are turned to the right or to the left at an angle of less than the chosen dead band value, i.e. ±5°. This dead band angle can be any programmed value but typically ranges from 3° to 15° and is approximately 5° in one preferred embodiment of the present invention. The desired rear wheel angle for front wheel angles of greater than the preprogrammed dead band angle is provided by a polynomial relationship.

In another preferred embodiment more suitable to all speeds, the desired rear wheel angle is determined by a front to rear relational curve that provides desired rear wheel angles for coordinated and crab mode steering. The desired rear wheel angles may be stored in the memory of the controller means in tabulated form or arithmetic expressions of the relational curves may be stored. A plurality of relational curves may also be stored in the memory of the controller means thereby enabling the operator or technician to select the appropriate relational curve for the vehicle and the specific driving conditions.

In the embodiments discussed immediately above, the desired rear wheel angle is dependent only upon the actual front wheel angle or just-measured front wheel angle and not the vehicle speed. However, specific relational curves will be employed by the controller means at specific vehicle speeds and more important, certain relational curves will not be employed when the vehicle's actual speed is exceeding a predetermined safe speed for that specific relational curve. For example, a relational curve that includes a preprogrammed dead band range will be employed at high speeds for all-wheel steering which locks the rear wheels during slight or incremental turning of the front wheels. In this manner, the appropriate relational curve is selected for the appropriate speed to improve the handling of the vehicle.

The system also provides a means for measuring or sensing the actual rear wheel angle. The actual rear wheel angle is then communicated to the controller means. The controller means compares the actual rear wheel angle and the just-calculated desired rear wheel angle based upon the just-measured front wheel angle. If the difference between the actual rear wheel angle and the desired rear wheel angle is greater than the predetermined desired amount, the controller means sends a signal to the means for controlling the actual rear wheel angle which will result in the rear wheel angle being adjusted to the just-calculated desired rear wheel angle.

The present invention may be used in connection with vehicles having more than two rear axles. Each axle may include its own means for controlling its rear wheel angle or one rear axle may be mechanically linked to the other rear axle thereby enabling all four rear wheels being adjusted simultaneously. The present invention may also be used with vehicles having more than two rear axles, i.e. multiple axle trucks equipped with trailers.

The preferred embodiment will also provide a control panel which will enable the driver to select from a variety of modes including front wheel only, crab, coordinated and rear wheel only modes in addition to various full-time all-wheel steering modes. The crab and coordinated modes will determine the desired rear wheel angle based upon the relational curves, tabulated values or polynomial relationships as discussed above.

The independent rear wheel steering modes may include two or more options. Specifically, one independent rear wheel steering mode may include three predetermined positions of the rear wheels, a right position, a center or straight-ahead position and a left position. A switch in the form of a momentary rocker switch or a two or three button membrane switch may be provided enabling the driver to select from the three aforenoted rear wheel positions. In the alternative, a separate sensor such as a joy stick potentiometer or other control feature may be provided that will enable the driver to independently steer the rear wheels. The controller will preferably not allow this type of independent rear wheel steering when the vehicle is traveling above a predetermined speed limit.

As noted above, the relationship between the front wheel angle and desired rear wheel angle may be provided in the form of a relational curve, polynomial equation, set of tabulated values or other alternative arithmetic expressions. A relational curve may be conveniently plotted on a four quadrant, two access Cartesian coordinate system where one axis is the front wheel angle and the second axis is the desired rear wheel angle. Such a presentation facilitates the understanding of the relationship between the front wheel angle and the rear wheel angle and enables drivers, operators and technicians to more easily select the appropriate relational curve for the vehicle and driving conditions. Because the controller means is preferably a microcomputer with memory capacity, more than one relational curve may be stored in the controller means thereby providing the operator with the opportunity to select from various relational curves, depending upon the driving conditions. Finally, the present invention also allows the operator to manually select fixed ratio, coordinated and crab modes and independent rear wheel steering in a manner similar to that disclosed in the commonly assigned U.S. Pat. No. 5,111,901.

It is therefore an object of the present invention to provide an improved all wheel steering system that is applicable to cars, trucks as well as tractor-trailer rigs.

It is also an object of the present invention to provide an improved continuous all-wheel steering system.

Yet another object of the present invention is to provide an all-wheel steering system with a programmable dead band that maintains the rear wheels in a straight ahead position at high speeds.

BRIEF DESCRIPTION OF THE DRAWINGS

This invention is illustrated more or less diagrammatically in the accompanying drawings, wherein:

FIG. 1 is a series of four schematic diagrams which illustrate modes in which the steering system of the present invention may be operated;

FIG. 2 is a series of two schematic diagrams illustrating the difference between the front wheel, only and the crab steering modes of the present invention;

FIG. 3 is a series of two schematic diagrams illustrating the difference between the coordinated and front wheel only steering modes of the present invention;

FIG. 11 is a schematic diagram of a tractor-trailer rig showing the general arrangement of the controller means and operational elements of an all-wheel steering system made in conjunction with the present invention, particularly illustrating a two axle trailer with a single action cylinder for each axle and a single pump arrangement.

Figure 3A:
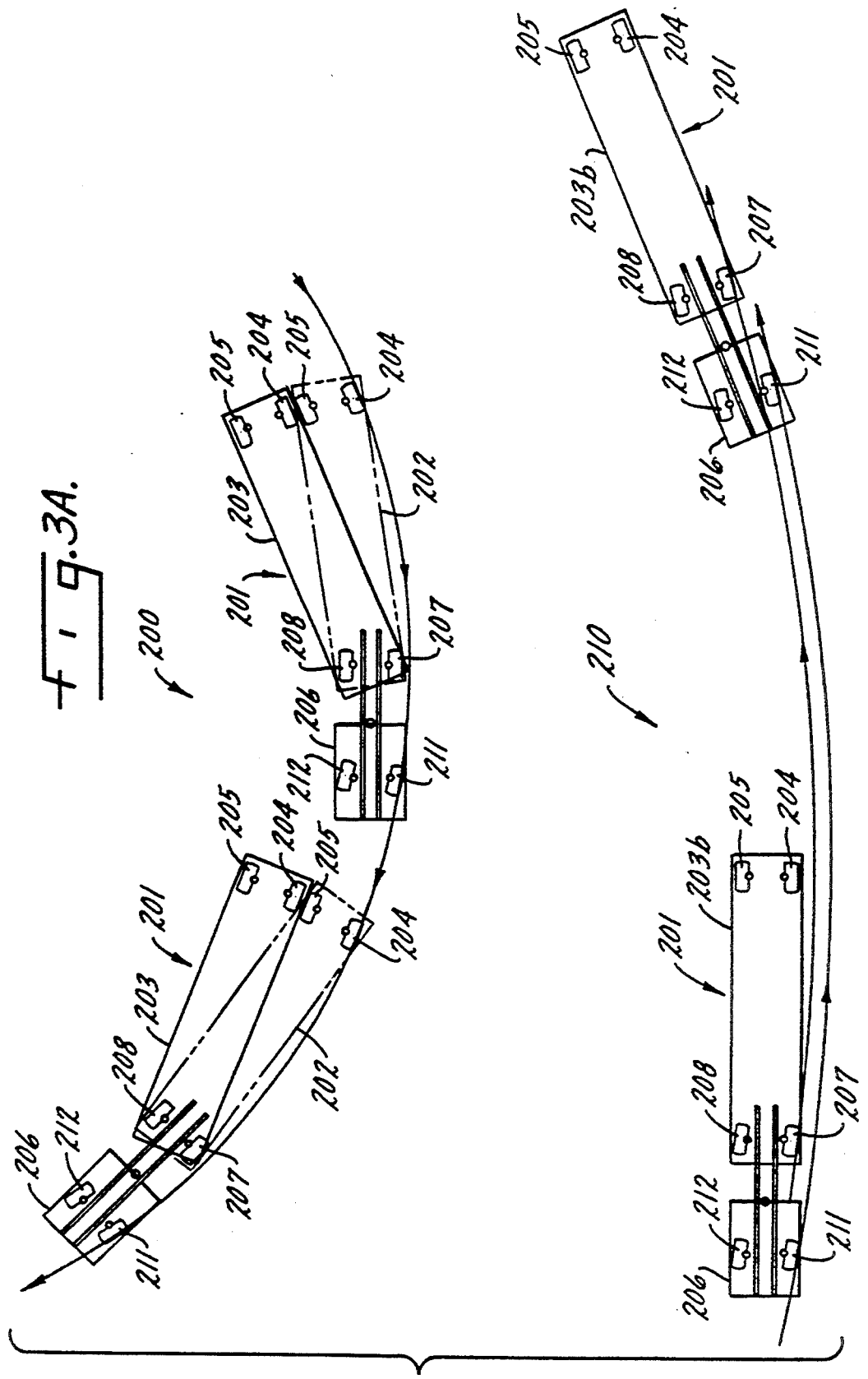
FIG. 3A is a series of two schematic diagrams illustrating the difference between coordinated and front wheel only steering modes as employed on a tractor-trailer rig.

It should be understood that the drawings are not necessarily to scale and that the embodiments shown are sometimes illustrated by graphic symbols, phantom lines, diagrammatic representations and fragmentary views. In certain instances, details, which are not necessary for an understanding of the present invention or which render other details difficult to perceive, may have been omitted. It should be understood, of course, that the invention is not necessarily limited to the particular embodiments illustrated herein.

DETAILED DESCRIPTION OF THE INVENTION

Like reference numerals will be used to refer to like or similar parts from figure to figure in the following description of the drawings.

The dramatic improvement contributed by this invention is best understood after consideration of 'the other two types of all wheel steering systems that are currently available. The manually selectable mode-type, as discussed above, requires the operator to select from a series of mechanically fixed modes. The operator shifts from one mode to another mode by pressing a button or operating a shift lever. The rear wheel angle is determined by gear ratios and the number of modes is limited.

The automatic type of all wheel steering systems normally employs a microcomputer that controls the rear wheel angle in accordance with a series of physical parameters. Most of the automatic systems currently available determine the rear wheel angle after the microcomputer performs a series of complex calculations that the operator is either unaware of or does not understand. For example, in many automatic systems available today, the desired rear wheel angle is the function of the velocity derivative of vehicle, yaw rates, the angle and velocities of the front and rear wheels and the angle and velocity of the steering shaft.

On the other hand, the present invention determines the desired rear wheel angle in accordance with a simplified relational curve which is selected from a series of relational curves stored in the memory of the controller. Alternatively, the desired rear wheel angle may be selected from a variety of tables of desired rear wheel angles stored in the memory of the controller. The operator may select from a number of available relational curves or sets of desired of rear wheel angles, each being suited to particular driving conditions and customized for the particular vehicle. The relational curves of the present invention may also be dependent upon vehicle speed. Finally, the operator may also select from a number of steering modes including front wheel only, crab, coordinated and a plurality of independent rear wheel steering modes. Thus, the present invention simplifies the full time all wheel steering modes currently available and further combines full time all wheel steering with the benefits of manual mode selection.

FIG. 1 is a series of four schematic diagrams comparing the four steering modes of an all wheel steering system. Schematic 11 is an illustration of straight-ahead driving; the rear wheels 14, 15 (and incidentally, the front wheels 12, 13) are in the straight-ahead or 0° position. In the front wheel only steering mode, the rear wheels 14, 15 remain locked in the 0° or straight-ahead position while the operator is free to steer the front wheels 12, 13. In schematic 16, the vehicle is being turned to the right in the crab mode. The front wheels 12, 13 are turned to the right at an angle of 6° and the rear wheels 14, 15 are turned to the right at an angle of 3°. The crab mode shown in schematic 16 is especially useful for high speed maneuvers such as lane changes on highways. The reader will note that the front wheels are only turned to the right at a 6° angle in schematic 16 and further that the magnitude of the rear wheel angle (3°) is less than that of the front wheel angle (6°).

In schematic 17, the front wheels 12, 13 have been turned more to the right to an angle of 12° and the rear wheels 14, 15 have resumed the 0° or straight-ahead position. Front wheel angles of greater than 6° are not achieved at high speeds which are appropriate for the crab mode and further the crab mode provides no significant advantage at low speeds. The mode or phase shown in schematic 17 is known as the transition mode. The vehicle is in between the crab mode shown in schematic 16 and the coordinated shown in schematic 18 and the rear wheels 14, 15 have returned from an angle in the direction of the front wheels 12, 13 back toward a straight-ahead position. In schematic 18, the front wheels 12, 13 have been turned farther to the right to make a sharp turn at 30°. Sharp turns are made in the coordinated mode which is appropriate for low speed maneuvers. As seen in schematic 18, the rear wheels 14, 15 have been turned in a direction opposite to that of the front wheels 12, 13, minus 9° or 9° to the left in contrast to the 30° to the right position of the front wheels 12, 13. The coordinated mode illustrated in schematic 18 provides a much smaller turning radius than provided in the front wheel only steering modes.

FIG. 2 is a comparison of front wheel only steering (schematic 19; see also FIG. 1, schematic 11) and the crab mode (schematic 21; see also FIG. 1, schematic 16). In the crab mode illustrated in schematic 21, a 6° front wheel angle results in a turning radius of 311.4 feet. In the front wheel steering mode illustrated in schematic 19, a front wheel steering angle of 6° results in a turning radius of 157 feet. Both vehicles shown in schematics 19 and 21 make the same approximate lane change. However, the reader will note that by increasing the turning radius by using crab mode (311.4 feet for crab mode as compared to 157 feet for front wheel steering only mode), the vehicle stability is greatly improved. Specifically, vehicle yaw is reduced and vehicle traction is improved due to the lower lateral g-forces resulting from an increased turning radius. The reduced lower lateral g-forces is especially important for vehicles for high centers of gravity, such as large heavy duty trucks and ARFF equipment.

FIG. 3 compares a vehicle making a sharp right turn in front wheel only mode (schematic 22; see also FIG. 1, schematic 11) with a vehicle making a sharp right turn in the coordinated mode (schematic 23; see also FIG. 1, schematic 18). A front wheel steering angle of 23° results in a minimum turning radius of 41.6 feet for the front wheel only steering mode as seen in schematic 22. In contrast, a front wheel steering angle of 23° results in a minimum turning radius of 33.6 feet for the coordinated mode as seen in schematic 23. Thus, the main benefit provided by coordinated steering is the reduced turning radius and increased maneuverability in tight spaces for both large and small vehicles.

The first schematic 200 in FIG. 3A illustrates the difference between a tractor-trailer rig 201 that is equipped with a trailer 202 (shown in phantom) that includes an all wheel steering system and a trailer 203 (shown in solid) that either does not include an all wheel steering system or is using a front wheel only steering mode. The trailer 202 is shown in the coordinated mode with the rear wheels 204, 205 turned to the left throughout most of the right turn. In contrast, the trailer 203 in the front wheel only steering mode, exhibits off-tracking, or movement of the trailer 203 inside of the intended circumference of the turn. Off-tracking can result in collision of the trailer 203 with a lightpost, sign or pedestrian standing on a street corner. Use of a coordinated steering mode maintains the alignment of the rear wheels 204, 205 of the trailer 202 with the intended circumference of a turn and allows the driver of a tractor-trailer rig 201 to make sharper turns on crowded city streets. For longer trailers, a delay in the turning of the rear wheels 204, 205 (and possibly even a slight delay in the turning of the rear wheels 207, 208) enhances the ability of the trailer 202 to track the path of the tractor or cab 206.

The second schematic 210 of FIG. 3A illustrates the use of crab steering with the front wheels 207, 208 of the trailer 203 when the rig 201 is being backed up. Turning the wheels 207, 208 of the trailer 203b in the same direction as the wheels 211, 212 of the tractor 206 simulates a straight truck or a truck without a pivoting trailer.

Figure 4:
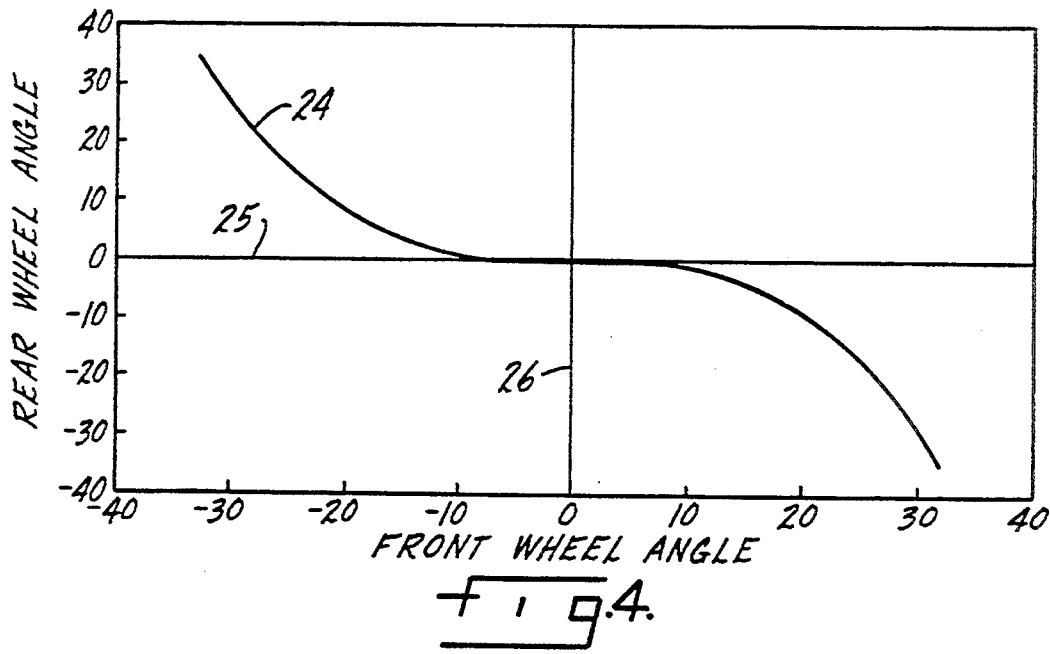
FIG. 4 is a representative graph of an example relational curve for moderate to high speed use employing an approximate 5° dead band.

FIG. 4 is an illustration of a coordinated steering mode for use at high speeds. Starting from the upper left of the curve 24, both the front and rear wheels are turned to the left about 30°. However, moving toward the horizontal axis 25 and vertical axis 26, the rear wheel angle approaches zero as the front wheel angle approaches about 5°. The area of the curve 24 where the front wheel angle is between 5° on the left and 5° on the right (along the horizontal axis 25) is known as a "dead band". The purpose of the dead band is to permit the front wheels to be steered a pre-set amount (in this case, approximately 5°) before beginning the rear wheel steering. When the rear wheels begin to steer, they move in an exponential steering curve so that the front wheels and rear wheels arrive at full cramp (approximately 30°) at the same time. The dead band allows the vehicle to travel at highway speeds in the coordinated mode without fear of the rear wheels being turned during lane changes and obstacle avoidance maneuvers. A variety of dead band curves 24 may be stored in the controller and the degrees of dead band ($\pm 5°$ in the case of FIG. 4) may be varied depending upon maximum vehicle speed and the wheel base of the vehicle. Use of appropriate dead band curves eliminates the need for a speed-regulated lockout of the rear axles. In the preferred embodiment, the controller will send a signal to unlock the rear axles before the front wheels reach the dead band limit in anticipation of the front wheels crossing the dead band limit. This function avoids simultaneous unlocking and steering of the rear axles which could cause the rear axle locking mechanism to bind.

Figure 5:
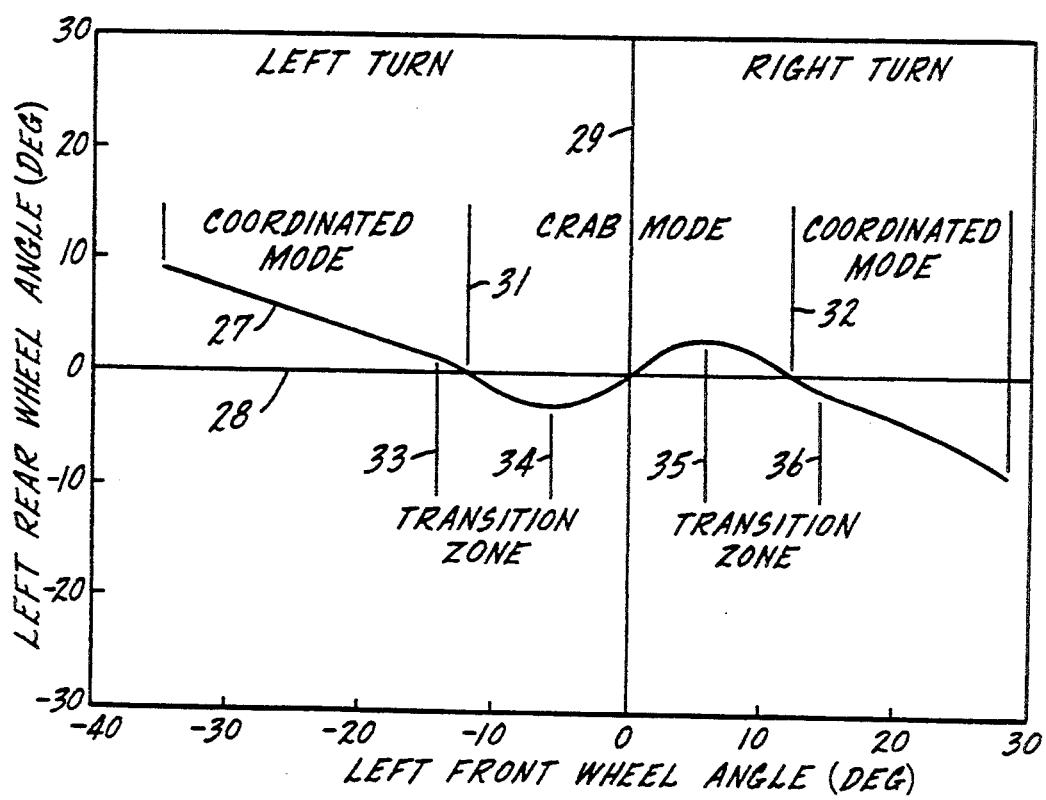
FIG. 5 is a representative graph of an example relational curve for all-wheel steering at low to high speeds.

Turning to FIG. 5, an all speed relational curve 27 is illustrated. The relational curve 27 is dependent upon two variables, the left front wheel angle plotted along the horizontal axis 28 and the left rear angle plotted along the vertical axis 29. A positive angle means the wheel is directed to the right; a negative angle indicates that the wheel is directed to the left. After the operator selects the relational curve shown in FIG. 5, the vehicle will be steered almost exclusively in two modes, either coordinated or crab.

Referring to the left-hand side of FIG. 5, the vehicle is in the coordinated mode when the front wheel 13 is turned to the left at an angle of approximately 12° or greater as shown by the transition line 31. Once the front wheel angle is steered past or to an angle greater than 12°, the relational curve 27 crosses the transition line 31 and the rear wheel 15 turns to the right as seen by the relational curve 27 crossing the horizontal axis 28. In the region marked "coordinated mode" at the left side of FIG. 5, the rear wheel 15 is turned to the right and the front wheel 13 is turned to the left thereby resulting in the reduced minimum turning radius discussed above. Similarly, referring to the right side of FIG. 5, the front wheel 13 is turned to the right and as the front wheel 13 is turned past the 12° mark or the transition line 32, the rear wheel 15 is turned to the left. In the region marked "coordinated mode" at the right side of FIG. 5, the vehicle is poised to make a sharp turn to the right. In the region marked "coordinated mode" at the left side of FIG. 5, the vehicle is poised to make a sharp turn to the left.

The center portion of FIG. 5 illustrates the operation of the crab steering mode. As noted above, the crab mode is for high to moderate speeds in contrast with the coordinated mode which is intended for low speeds only. Essentially, as seen on the left side of the vertical axis 29, when the front wheels 12, 13 are turned to the left at an angle of less than about 12°, the rear wheels 14, 15 track the front wheels 12, 13 and also turn to the left. Turning to the right of the vertical axis 29, when the front wheels 12, 13 is turned to the right at an angle of less than about 12°, the rear wheels 14, 15 'track the front wheels 12, 13 and also turn to the right. As the angle of the front wheels 12, 13 is increased past about 12° in either direction, the angle of the rear wheels 14, 15 is decreased until it reaches the straight-ahead position at the transition lines 31, 32 and then the rear wheels 14, 15 go into the coordinated mode as the front wheel angle is increased.

The transition zones are bound by lines 33, 34 for left turns and by lines 35, 36 for right turns. The transition zones are the zones where the rear wheels 14, 15 are reversing direction. For example, referring to line 33, as the rear wheel 15 is turned to the right slightly at about 2° when the front wheel 13 is turned to the left at about. 14°. As the angle of the front wheel 13 is reduced, the rear wheel 15 is turned to the left as the system enters into the crab mode where both the front wheels 12, 13 and the rear wheels 14, 15 are turned to the left.

Similarly, at line 36, the front wheel 13 is turned to the right at about 14° and the rear wheel 15 is turned to the left at about 2°. As the angle of the front wheel 13 is reduced, the rear wheel 15 is turned to the right and the system enters into the crab mode where the both the front wheels 12, 13 and the rear wheels 14, 15 are turned to the right.

Figure 6:
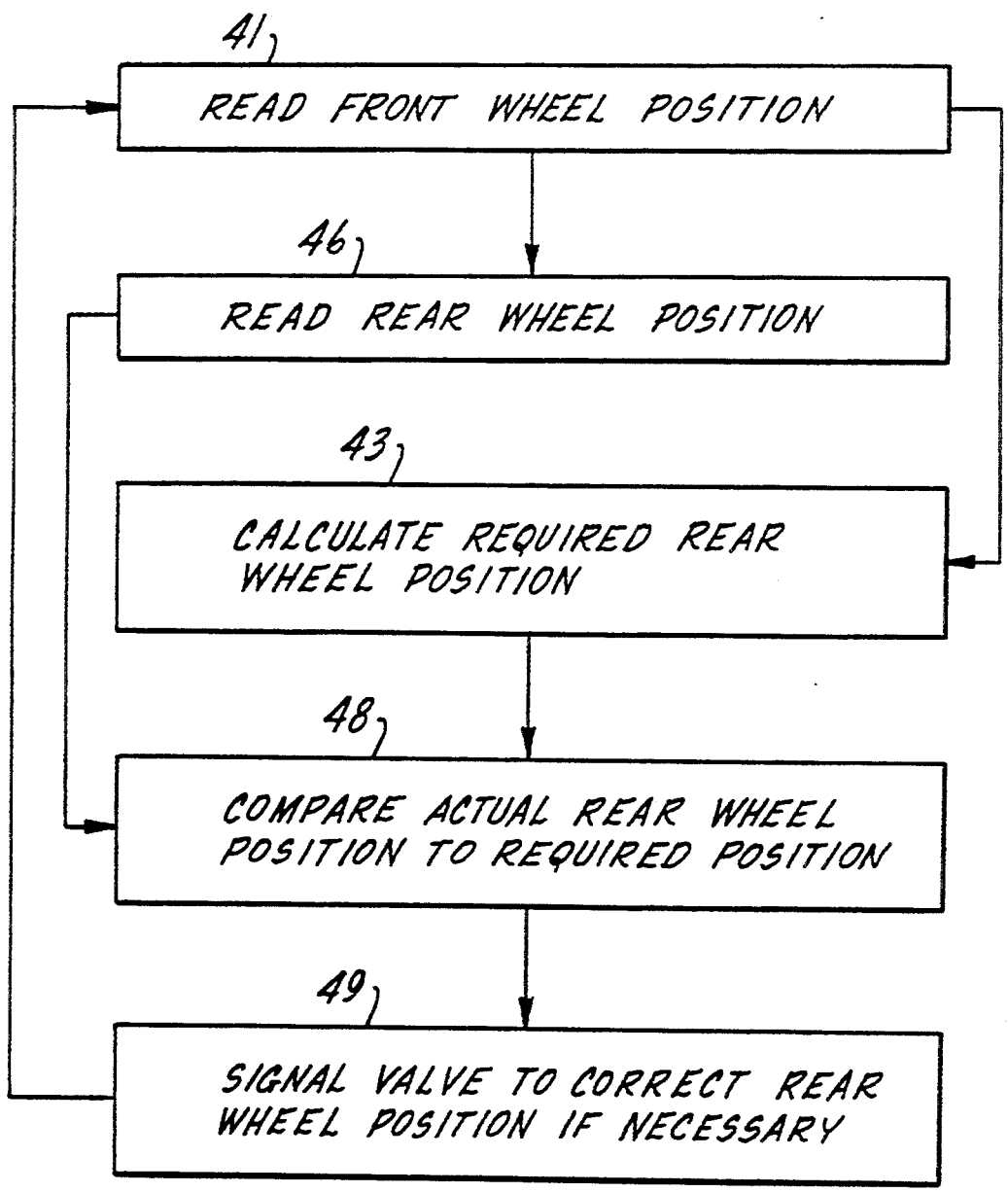
FIG. 6 is a functional block diagram of an all-wheel steering system designed in accordance with the present invention.

FIG. 6 is a logic flow chart of the all wheel steering system of the present invention. The front wheel sensor 37 (see FIG. 7) reads the front wheel 12 position at 41 and this position is communicated to the controller means 42 (see FIGS. 7-10) at 43 via communication means 44 (see FIGS. 7-10). The controller 42 then calculates the desired rear wheel angle at 43. A rear wheel sensor 45 (see FIGS. 7-10) reads the rear wheel angle at 46 and this position is communicated to the controller 42 via communication means 47 (see FIGS. 7-10). The controller 42 then compares the actual rear wheel position with the just as calculated desired rear wheel position at 48. If the difference between the desired rear wheel position and the actual rear wheel position is greater than a predetermined amount, the controller means 42 will send a signal proportional to this difference at 49 to the means for controlling the rear wheel angle or the four-way proportional valve 51 (see FIGS. 7-10). The logic flow illustrated in FIG. 6 is operated continuously as a closed-loop feedback system.

Figure 7:
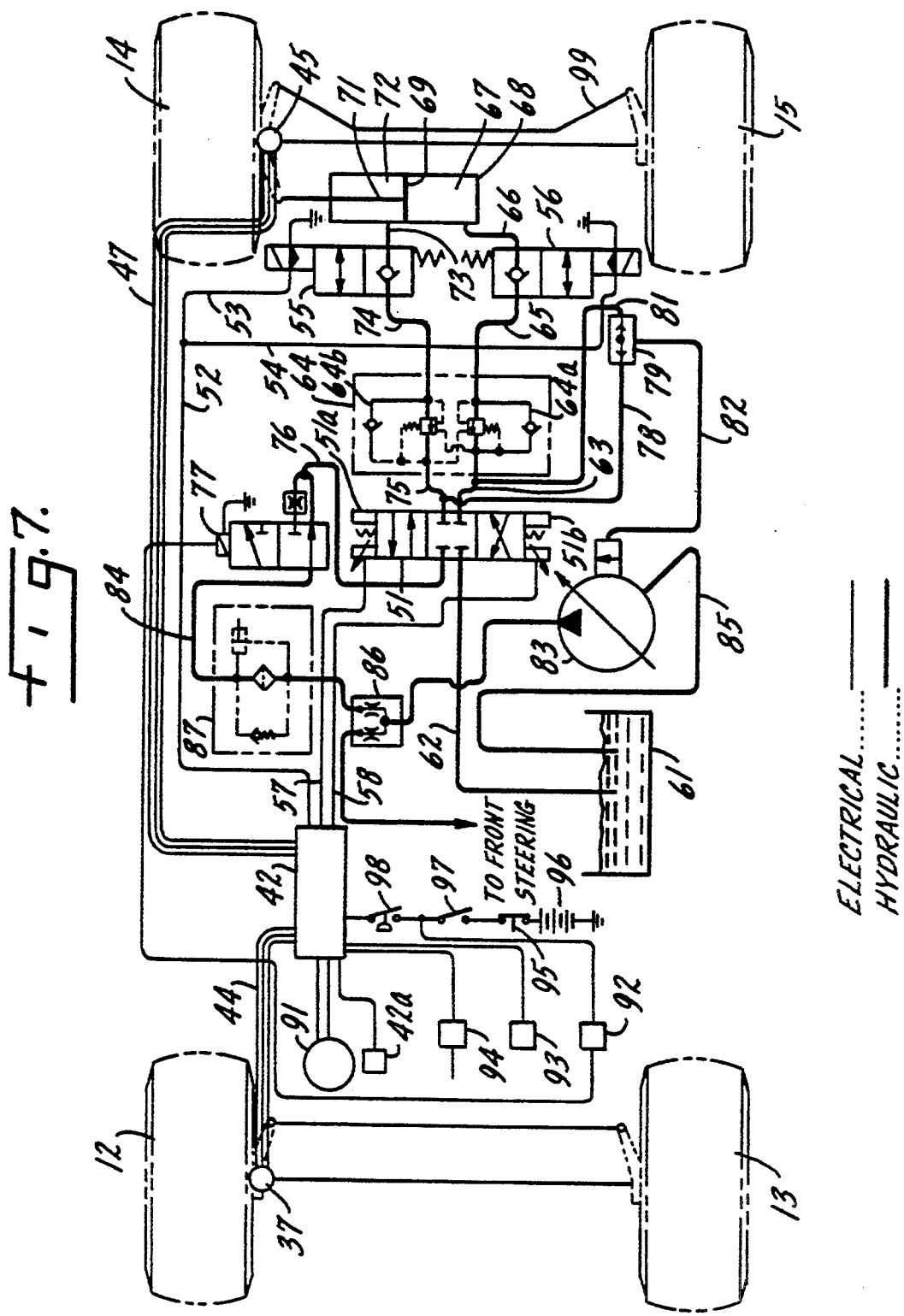
FIG. 7 is a schematic diagram of a vehicle showing the general arrangement of the controller means and operational elements of an all-wheel steering system made in accordance with the present invention, particularly illustrating a single rear axle, dual action cylinder, single pump arrangement.

FIG. 7 is a schematic diagram illustrating the electrical and hydraulic components of the present invention. As noted above, the sensor 37 measures the angle of the front wheels 12, 13 and communicates the front wheel angle over the communication means 44 to the controller 42 (see step 1 of FIG. 6). Contemporaneously, the sensor 45 measures the angle of the rear wheels 14, 15 and communicates the rear wheel angle over the communication means 47 to the controller 42. Based upon the just-measured front wheel angle, the controller 42 calculates a desired rear wheel position and compares the desired rear wheel position or angle with the just-measured rear wheel angle. If the difference between the desired rear wheel angle and the just-measured rear wheel angle is large enough to warrant a change in the rear wheel angle, the controller 42 then sends an instruction to the four-way proportional valve 51 (or the means for controlling the actual rear wheel angle) to adjust the angle of the rear wheels 14, 15.

Prior to any activation of the four-way proportional valve 51, the controller 42 sends a signal over the communication means 52, 53, 54 to unlock the check valves 55, 56 in the event the rear wheels 14, 15 are locked in the straight-ahead position. After the rear wheels 14, 15 are unlocked, the controller 42 sends a signal over the communication means 57 or 58, depending upon whether the rear wheels 14, 15 need to be turned to the right (to cause the vehicle to go to the left) or the left (to cause the vehicle to go to the right) respectively as discussed below.

For the purposes of illustration below, it will be noted that the wheels 12, 14 denote the right side of the vehicle and the wheels 13, 15 denote the left side of the vehicle.

If the rear wheels 14, 15 need to be turned to the right, the controller 42 sends a signal down the communication means 57 to activate the right half 51a of the four-way valve 51. When the right half 51a of the valve 51 is activated or open, oil flows from the reservoir 61 through the conduit 62, through the valve 51 to the conduit 63 through the left portion 64a of the counterbalance valve 64 to the conduit 65, through the check valve 56 to the conduit 66 and into the left-half 67 of the dual-action cylinder 68. Oil pressure in the left-half 67 of the cylinder 68 pushes the piston 69 and rod 71 to the right thereby causing the rear wheels 14, 15 to steer to the right (and causing the vehicle to turn to the left).

As the piston 69 and rod 71 are pushed toward the right-half 72 of the dual-action cylinder 68, oil leaves the right-half 72 of the cylinder 68 through the conduit 73 and passes through the check valve 55 and into the conduit 74. The oil then proceeds through the right portion 64b of the counterbalance valve 64 and exits through the conduit 75. The main flow of oil coming from the right-half 72 of the cylinder 68 is directed into the conduit 78 thereby passing through the shuttle valve 79 and blocking any flow through the shuttle valve 79 coming from the conduit 81. This action forces the oil coming through conduit 63 to pass through the counterbalance valve 64 as opposed to through the conduit 81 and through the shuttle valve 79. Oil does not flow backwards through valve 51. The oil is returned to the reservoir 61 through valve 51.

If it is determined at the controller 42 that the rear wheels 14, 15 need to be turned to the left, the controller 42 sends a signal over the communication means 58 to activate the left portion 51b of the four-way proportional valve 51. Fluid passes from the conduit 62 through the four-way proportional valve 51 into the conduit 75 and through the right-half 64b of the counterbalance valve 64 to the conduit 74 and through the check valve 55 into the right-half 72 of the dual-action cylinder 68. This action forces the rod 71 and piston 69 to the left thereby steering the rear wheels 14, 15 to the left (and the vehicle to the right). Fluid contained in the left-half 67 of the dual-action cylinder 68 is pushed through the conduit 66, through the check valve 56 and into the conduit 65. As the oil proceeds from the conduit 65 through the left-half 64a of the counterbalance valve 64, the back pressure in the conduit 62 forces the oil through the conduit 81 thereby throwing the shuttle valve 79 forward and closing the connection of the shuttle valve 79 to the conduit 78 thereby allowing oil to proceed from the conduit 81 into the conduit 82. The oil passing from the shuttle valve 79 through the conduit 82 is recirculated by the pump 83.

The response time orifice (RTO) 77 slows down the passage of oil from the conduit 84 to the conduit 76 and to the four-way valve 51 when the RTO 77 is activated. This slowing down of the transfer of oil to the four-way proportional valve 51 slows the response of the system in both automatic and manual (joystick modes) and provides a smooth correction of the rear wheel angle. Oil is pumped from the reservoir 61 through the conduit 85 by the pump 83 and through the flow divider 86 and through the filter 87.

The diagnostic wheel position gauge 91 informs the operator of the angles of the front wheels 12, 13 and rear wheels 14, 15. The response time switch 92 provides 12-volt power to the RTO 77. As discussed above, the all wheel steering system of the present invention includes selectable modes. The operator selects these modes using the mode select switch 93. Also discussed above, one possible mode is an independent rear wheel steering mode whereby the operator may control the rear wheels 14, 15 independent of the angles of the front wheels 12, 13. The angles of the rear wheels 14, 15 in this independent rear wheel mode are controlled using the joy stick 94. An alternative to the joy stick 94 would be a potentiometer (not shown). The system reset switch shown at 95 removes and then restores the 12-volt power shown at 96. The ignition switch is shown at 97 and the hydraulic psi switch is shown at 98. The calibration switch is shown at 42a.

Figure 8:
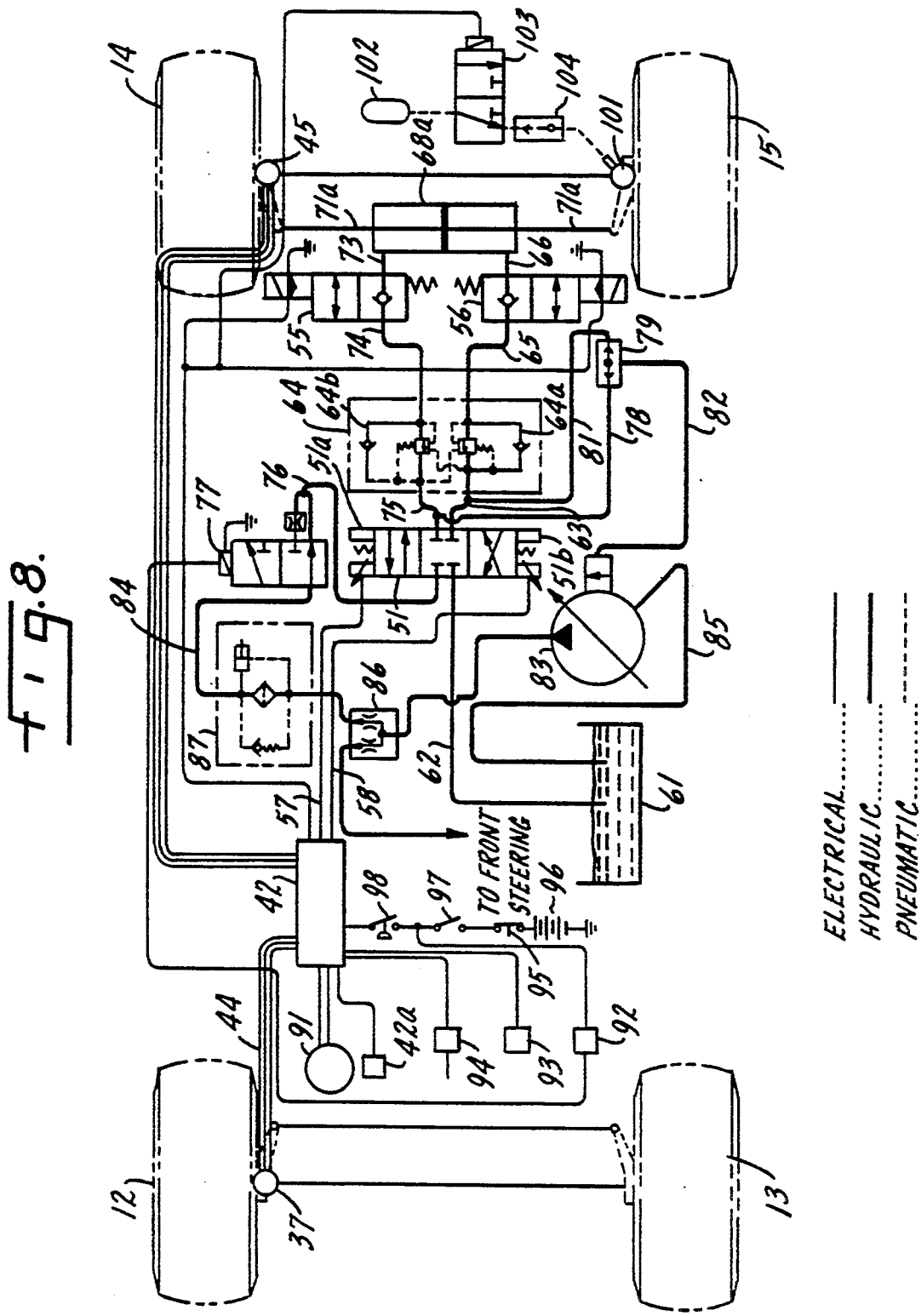
FIG. 8 is a schematic diagram of a vehicle showing the general arrangement of the controller means and operational elements of an all-wheel steering system made in accordance with the present invention, particularly illustrating a single rear axle, balanced cylinder, single pump arrangement with an air/mechanical rear axle lock.

FIG. 8 is one of many variations to the embodiment shown in FIG. 7 and specifically features a balanced cylinder 68a as opposed to the dual action cylinder 68 shown in FIG. 7. The balanced cylinder 68 eliminates the need for the tie rod 99 (see FIG. 7) as the piston 71a directly controls the angle of both rear wheels 14, 15. The other alternative feature shown in FIG. 8 is the incorporation of the mechanical lock 101. The lock is activated by air pressure supplied by the pressurized air tank 102. When the air valve 103 is activated, air passes through the quick release valve 104 to activate the mechanical lock 101.

Figure 9:
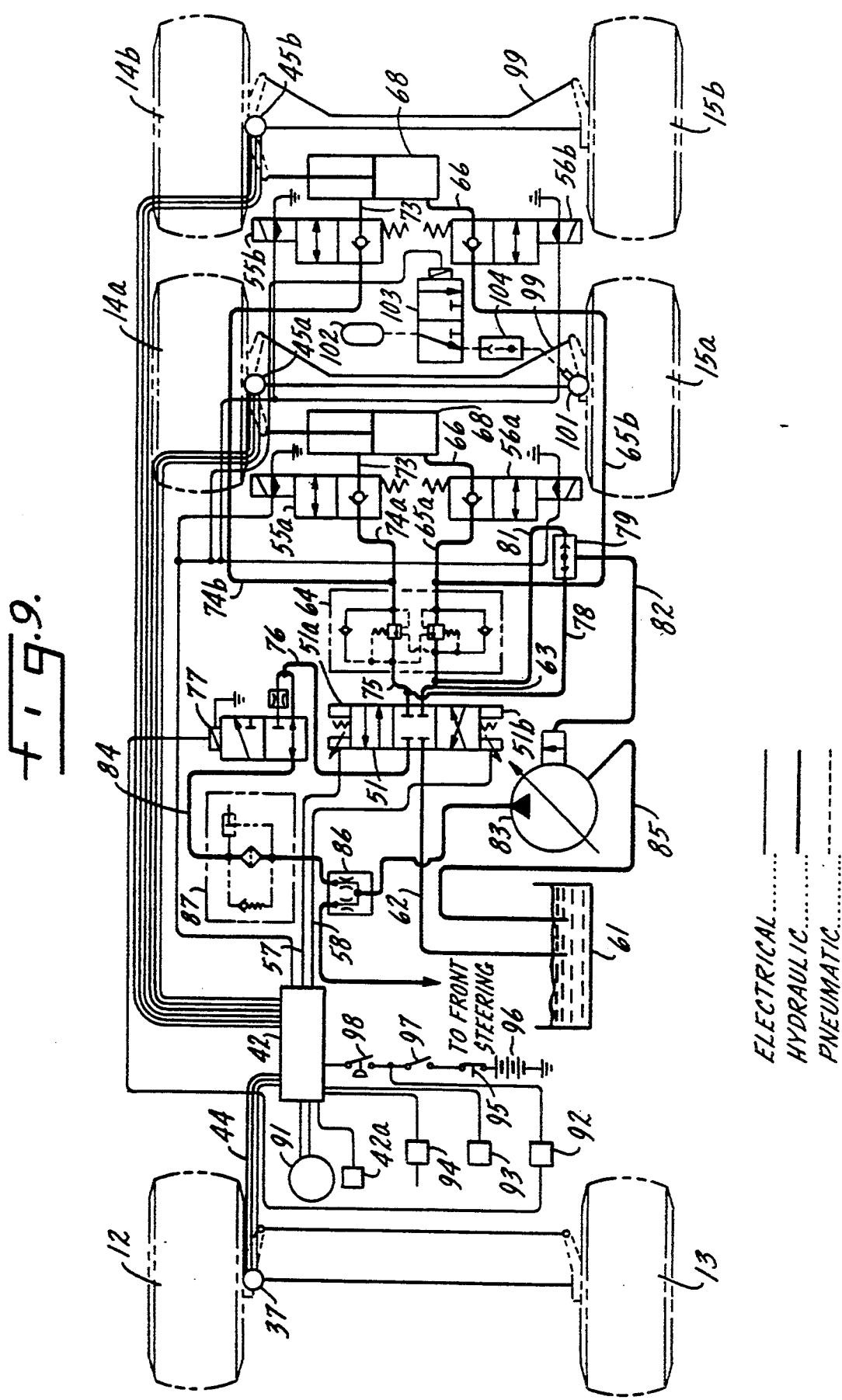
FIG. 9 is a schematic diagram of a vehicle showing the general arrangement of the controller means and operational elements of an all-wheel steering system made in accordance with the present invention, particularly illustrating a two rear axle, single dual action cylinder for each rear axle and dual pump arrangement.

Yet another alternative embodiment of the present invention is illustrated in FIG. 9 where the all wheel steering system of the present invention is applied to a vehicle with four rear wheels 14a, 14b, 15a, 15b. In comparing FIG. 9 with FIG. 7, the reader will note that the flow exiting the counterbalance valve 64 is split into conduits 74a, 74b and 65a, 65b. The conduits 74b, 65b extend rearward to the check valves 55b, 56b corresponding to the rear wheels 14b, 15b while the conduits 74a, 65a extend rearward to the check valves 55a, 56a corresponding to the rear wheels 14a, 15a. A sensor 45a, 45b is mounted on each right rear wheel 14a, 14b, respectively. Similar to the embodiment shown in FIG. 8, the embodiment shown in FIG. 9 also features a mechanical lock 101, air tank 102, air valve 103 and quick release valve 104. The embodiment shown in FIG. 9 also incorporates the dual action cylinders 68 and tie rods 99 featured in FIG. 7.

Figure 10:
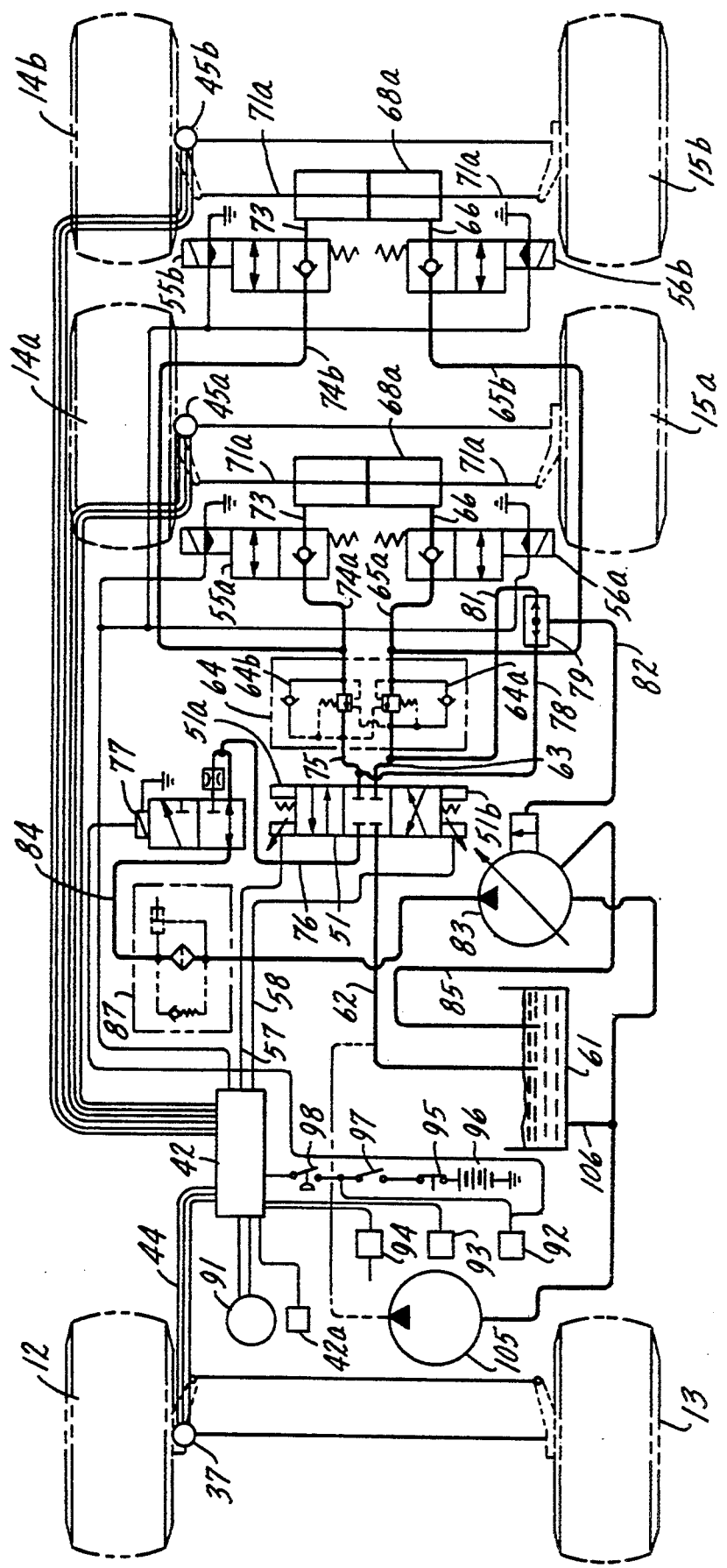
FIG. 10 is a schematic diagram of a vehicle showing the general arrangement of the controller means and operational elements of an all-wheel steering system made in accordance with the present invention, particularly illustrating a two rear axle, two balanced cylinder and single pump arrangement.

FIG. 10 is still another alternative embodiment featuring two sets of rear wheels 14a, 14b, 15a, 15b. The wheels are turned with the balanced cylinders shown at 68a similar to those shown in FIG. 8. The hydraulic system features two pumps 83 and 105. The pump 83 is a variable displacement pump and provides 250 psi when in the idle position. The hydraulic pump 105 draws fluid from the reservoir 61 through the conduit 106 and provides fluid return to the conduit 62.

Finally, FIG. 11 is an illustration of an all wheel steering system described above as incorporated into a tractor trailer rig 23b. The components are analogous to those discussed above with respect to FIGS. 7 through 10. Specifically, dual action cylinders and dual pump systems may be employed on trailers. Further, a joystick for independent rear wheel steering will provide the driver with an additional measure of control when backing up the trailer 23b.

Although several preferred embodiments of the present invention have been illustrated and described, it will at once be apparent to those skilled in the art that still other variations may be made within the spirit and scope of the present invention. Specifically, numerous other combinations of dual action cylinders and balanced cylinders may be employed. One or two pumps may be used and air or mechanical lock may be used to lock the rear wheels 14, 15 in the straight ahead or 0° position in addition to the locking means provided by the check valves 55, 56 and the controller means 42.

Accordingly, it is intended that the scope of the invention be limited solely by the scope of the hereafter appended claims and not by any specific wording in the foregoing description.

We claim:

1. An all wheel steering system for a vehicle having front wheels with a front wheel angle, rear wheels with a rear wheel angle, and a steering wheel, the front wheel angle being determined by an operator positioning the steering wheel, the rear wheel angle being determined by the system, the system comprising:

means for sensing a front wheel angle of at least one front wheel, means for communicating the front wheel angle to a controller means, the controller means including a memory containing at least one desired rear wheel angle for each front wheel angle, the desired rear wheel angle being dependant upon the front wheel angle when the front wheel angle exceeds a deadband value ranging from 3° to 15°, the desired rear wheel angle is 0° when the front wheel angle does not exceed the deadband value regardless of vehicle speed the controller means retrieving a desired rear wheel angle based on the front wheel angle from the memory of the controller means, means for sensing an actual rear wheel angle of at least one rear wheel, means for communicating the actual rear wheel angle to the controller means, the controller means comparing the actual rear wheel angle with the desired rear wheel angle, the controller means sending a signal to alter the actual rear wheel angle to a means for controlling the actual rear wheel angle if the actual rear wheel angle differs from the desired rear wheel angle by an amount that is greater than a desired amount.

2. The system of claim 1, wherein the rear wheels comprise a first pair of rear wheels mounted on a first rear axle, the vehicle further including a second pair of rear wheels mounted on a second rear axle, the first pair of rear wheels being mounted on opposing sides of the first rear axle, the second pair of rear wheels being mounted on opposing sides of the second rear axle, a sensor means for measuring the rear wheel angle of at least one rear wheel of the first pair of rear wheels, a sensor means for measuring the rear wheel angle of at least one rear wheel of the second pair of rear wheels, means for communicating the actual rear wheel angle of the first pair of rear wheels to the controller means, means for communicating the actual rear wheel angle of the second pair of rear wheels to the controller means, the controller means sending a signal to alter the actual rear wheel angle of the first pair of rear wheels to a means for controlling the actual rear wheel angle of the first pair of rear wheels if the actual rear wheel angle of the first pair of rear wheels differs from the desired rear wheel angle by an amount that is greater than a desired amount, the controller means sending a signal to alter the actual rear wheel angle of the second pair of rear wheels to a means for controlling the actual rear wheel angle of the second pair of rear wheels if the actual rear wheel angle of the second pair of rear wheels differs from the desired rear wheel angle by an amount that is greater than a desired amount.

3. The system of claim 1,
wherein the system includes a plurality of steering modes including a first all-wheel steering mode characterized as including a plurality of desired rear wheel angles including a straight-ahead desired rear wheel angle, and a second all-wheel steering mode in which a relational curve defines a relationship between the front wheel angle and the desired rear wheel angle, the relational curve being plotted on a two axis cartesian coordinate system, one axis being the front wheel angle, a second axis being the desired rear wheel angle.

4. The system of claim 1,
wherein a relational curve defines a relationship between the front wheel angle and the desired rear wheel angle, the desired rear wheel angle being determined by the front wheel angle on the relational curve, the relational curve being plotted on a two axis cartesian coordinate system, one axis being the front wheel angle, a second axis being the desired rear wheel angle.

5. The system of claim 3,
further including a plurality of relational curves, the system employing one relational curve at a time.

6. The system of claim 5,
wherein at least one relational curve being dependent upon vehicle speed, the system employing one relational curve at a time.

7. The system of claim 1,
wherein the desired rear wheel angle is always lower in magnitude than the front wheel angle.

8. The system of claim 3,
wherein the steering modes further include a first rear wheel steering mode where the controller includes at least three desired rear wheel angles stored in the memory of the controller, a first desired rear wheel angle being right of center, a second desired rear wheel angle being left of center and a third desired rear wheel angle being approximately center.

9. The system of claim 8,
wherein manual switching means enables the operator to choose one of said desired rear wheel angles.

10. The system of claim 9,
wherein the all-wheel steering modes further include a second rear wheel steering mode in which the desired rear wheel angle may be controlled independently of the front wheel angle.

11. The system of claim 1,
further including a means for locking all rear wheels in a straight-ahead position if an operating component of the system fails.

12. The system of claim 1,
further including a means for locking all rear wheels in their current position if an operating component of the system fails.

13. The system of claim 3,
further including a manual switching means for selecting from a plurality of all-wheel, front-wheel and rear wheel steering modes.

14. The system of claim 13,
wherein the steering modes include
a front wheel only steering mode in which the desired rear wheel angle is fixed in a straight-ahead position,
a third all-wheel steering mode in which the desired rear wheel angle is generally opposite in direction to that of the front wheel angle, and
a fourth all-wheel steering mode in which the desired rear wheel angle is generally of a same direction as that of the front wheel angle.

15. The system of claim 1,
wherein the rear wheels comprise a first pair of rear wheels mounted on a first rear axle, the vehicle further including a second pair of rear wheels mounted on a second rear axle, the first pair of rear wheels being mounted on opposing sides of the first rear axle, the second pair of rear wheels being mounted on opposing sides of the second rear axle, a sensor means for measuring the rear wheel angle of at least one rear wheel of the first pair of rear wheels, means for communicating the actual rear wheel angle of the first pair of rear wheels to the controller means, the first rear axle being linked to the second rear axle.

16. A four wheel steering system for a vehicle having a pair of front wheels and at least one pair of rear wheels, the front and rear wheels being steerable, the system comprising:

means for sensing a front wheel angle of at least one front wheel, means for communicating the front wheel angle to a controller means, the controller means including a memory, means for sensing the speed of the vehicle, means for communicating the speed of the vehicle to the controller, the memory of the controller means containing at least one desired rear wheel angle for each front wheel angle for each speed of the vehicle, the controller means retrieving a desired rear wheel angle based on the front wheel angle and the speed from the memory of the controller means, the desired rear wheel angles being dependant upon the speed of the vehicle and the front wheel angle when the front wheel angle exceeds a deadband value ranging from 3° to 15°, the desired rear wheel angle is 0° when the front wheel angle does not exceed the deadband value regardless of vehicle speed, means for sensing an actual rear wheel angle of at least one rear wheel, means for communicating the actual rear wheel angle to the controller means, the controller means comparing the actual rear wheel angle with the desired rear wheel angle, the controller means sending a signal to alter the actual rear wheel angle to a means for controlling the actual rear wheel angle if the actual rear wheel angle differs from the desired rear wheel angle by an amount greater than a desired amount.

17. The system of claim 16, wherein the desired rear wheel angle is a straight-ahead position when the vehicle is travelling above a predetermined speed, the straight-ahead desired rear wheel angle corresponds to front wheel angles ranging from about 5° to the left of center to about 5° to the right of center when the vehicle is travelling above said predetermined speed.

18. The system of claim 17, further including a manual switching means for manual selection of a plurality of steering modes.

19. The system of claim 18, wherein the steering modes including a front wheel only steering mode in which the desired rear wheel angle is fixed in a straight-ahead position, a low speed all wheel coordinated steering mode in which the desired rear wheel angle is generally opposite in direction and lower in magnitude to that of the front wheel angle, a moderate speed all wheel crab steering mode in which the desired rear wheel angle is generally of a same direction but lower in magnitude as that of the front wheel angle, an independent rear wheel steering mode in which the rear wheel angle is independent of the front wheel angle.

20. The system of claim 19, wherein the independent rear wheel steering mode is further characterized as including at least three desired rear wheel angles stored in the memory of the controller, a first desired rear wheel angle being right of center, a second desired rear wheel angle being left of center and a third desired rear wheel angle being approximately center, the manual switching means enabling the operator to choose one of said desired rear wheel angles.

21. The system of claim 20, further including a means for locking all rear wheels in a straight-ahead direction when a component of the system fails or when the system is shut down.

22. The system of claim 20, wherein the rear wheels comprise a first pair of rear wheels mounted on a first rear axle, the vehicle further including a second pair of rear wheels mounted on a second rear axle, the first pair of rear wheels being mounted on opposing sides of the first rear axle, the second pair of rear wheels being mounted on opposing sides of the second rear axle, a sensor means for measuring the rear wheel angle of at least one rear wheel of the first pair or rear wheels, means for communicating the actual rear wheel angle of the first pair of rear wheels to the controller means, the first rear axle being linked to the second rear axle.

23. The system of claim 21, wherein the rear wheels comprise a first pair of rear wheels mounted on a first rear axle, the vehicle further including a second pair of rear wheels mounted on a second rear axle, the first pair of rear wheels being mounted on opposing sides of the first rear axle, the second pair of rear wheels being mounted on opposing sides of the second rear axle, a sensor means for measuring the rear wheel angle of at least one rear wheel of the first pair or rear wheels, a sensor means for measuring the rear wheel angle of at least one rear wheel of the second pair of rear wheels, means for communicating the actual rear wheel angle of the first pair of rear wheels to the controller means, means for communicating the actual rear wheel angle of the second pair of rear wheels to the controller means, the controller means sending a signal to alter the actual rear wheel angle of the first pair of rear wheels to a means for controlling the actual rear wheel angle of the first pair of rear wheels if the actual rear wheel angle of the first pair of rear wheels differs from the desired rear wheel angle by an amount that is greater than a desired amount, the controller means sending a signal to alter the actual rear wheel angle of the second pair of rear wheels to a means for controlling the actual rear wheel angle of the second pair of rear wheels if the actual rear wheel angle of the second pair of rear wheels differs from the desired rear wheel angle by an amount that is greater than a desired amount.

24. An all wheel steering system for a tractor-trailer rig, the tractor having at least one pair of front wheels with a front wheel angle, the tractor also including a steering wheel, the trailer having at least one pair of rear wheels that is steerable and having a rear wheel angle, the front wheel angle of the tractor being determined by an operator positioning the steering wheel, the rear wheel angle being determined by the system, the system comprising:

means for sensing a front wheel angle of at least one front wheel, means for communicating the front wheel angle to a controller means, the controller means including a memory containing at least one desired rear wheel angle for each front wheel angle, the controller means retrieving a desired rear wheel angle based on the front wheel angle from the memory of the controller means, means for sensing an actual rear wheel angle of at least one rear wheel of the pair of rear wheels, means for communicating the actual rear wheel angle to the controller means, the controller means comparing the actual rear wheel angle with the desired rear wheel angle, the controller means sending a signal to alter the actual rear wheel angle to a means for controlling the actual rear wheel angle if the actual rear wheel angle differs from the desired rear wheel angle by an amount that is greater than a desired amount.

25. The system of claim 24,
wherein the system includes a plurality of steering modes including a first all-wheel steering mode characterized as including a plurality of desired rear wheel angles including a straight-ahead desired rear wheel angle, the straight-ahead desired rear wheel angle corresponding to front wheel angles ranging from about 5° to the left of center to about 5° to the right of center.

26. The system of claim 25,
wherein the steering modes further include second all-wheel steering mode in which a relational curve defines a relationship between the front wheel angle of the tractor and the desired rear wheel angle of the trailer, the relational curve being plotted on a two axis cartesian coordinate system, one axis being the front wheel angle, a second axis being the desired rear wheel angle.

27. The system of claim 24,
wherein a relational curve defines a relationship between the front wheel angle and the desired rear wheel angle, the desired rear wheel angle being determined by the front wheel angle on the relational curve, the relational curve being plotted on a two axis cartesian coordinate system, one axis being the front wheel angle, a second axis being the desired rear wheel angle.

28. The system of claim 26,
wherein the steering modes further include a first rear wheel steering mode where the controller includes at least three desired rear wheel angles stored in the memory of the controller, a first desired rear wheel angle being right of center, a second desired rear wheel angle being left of center and a third desired rear wheel angle being approximately center.

29. The system of claim 28,
wherein the all-wheel steering modes further include a second rear wheel steering mode in which the desired rear wheel angle may be controlled independently of the front wheel angle.

30. The system of claim 29,
wherein the steering modes include
a front wheel only steering mode in which the desired rear wheel angle is fixed in a straight-ahead position,
a third all-wheel steering mode in which the desired rear wheel angle is generally opposite in direction to that of the front wheel angle, and
a fourth all-wheel steering mode in which the desired rear wheel angle is generally of a same direction as that of the front wheel angle.

31. The system of claim 24,
wherein the controller means delays sending a signal to alter the actual rear wheel angle to a means for controlling the actual rear wheel angle to accommodate for the length of the trailer.

* * * * *